US011895636B2

(12) United States Patent
Andgart et al.

(10) Patent No.: US 11,895,636 B2
(45) Date of Patent: Feb. 6, 2024

(54) DETERMINATION OF BEAM CONFIGURATION (71) Applicant: Telefonaktiebolaget LM Ericsson (publ), Stockholm (SE)

(72) Inventors: Niklas Andgart, Sodra Sandby (SE); Johan Nilsson, Hollviken (SE); Andres Reial, Malmo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 224 days.

(21) Appl. No.: 15/317,950

(22) PCT Filed: Jun. 17, 2014

(86) PCT No.: PCT/EP2014/062677
§ 371 (c)(1),
(2) Date: Dec. 11, 2016

(87) PCT Pub. No.: WO2015/192889
PCT Pub. Date: Dec. 23, 2015

(65) Prior Publication Data
US 2017/0127398 A1 May 4, 2017

(51) Int. Cl.
*H04W 72/044* (2023.01)
*H04B 7/08* (2006.01)
(Continued)

(52) U.S. Cl.
CPC ........ *H04W 72/046* (2013.01); *H04B 7/0695* (2013.01); *H04B 7/088* (2013.01); *H04L 5/0048* (2013.01); *H04W 16/28* (2013.01)

(58) Field of Classification Search
CPC combination set(s) only.
See application file for complete search history.

(56) References Cited

U.S. PATENT DOCUMENTS 7,120,431 B1 * 10/2006 Huo ................. H04W 16/28
455/423
2005/0101352 A1   5/2005 Logothetis et al.
(Continued)

FOREIGN PATENT DOCUMENTS

CN      103688474 A    3/2014
JP      2014096852 A   5/2014
(Continued)

OTHER PUBLICATIONS

Https://www.merriam-webster.com/dictionary/decide.*
(Continued)

*Primary Examiner* — Charles C Jiang
*Assistant Examiner* — Shawn D Miller
(74) *Attorney, Agent, or Firm* — Leffler Intellectual Property Law, PLLC (57) ABSTRACT There is provided determination of a beam configuration between a first radio transceiver device and a second radio transceiver device. The first radio transceiver device performs beam searching by transmitting a first sounding signal in all transmit beam configurations in a set of transmit beam configurations; and receiving, from the second radio transceiver device, a second sounding signal in all receive beam configurations in a set of receive beam configurations. The first radio transceiver device determines a beam configuration based on the receive beam configuration in the set of receive beam configurations in which the second sounding signal having best predetermined metric was received.

23 Claims, 5 Drawing Sheets (51) Int. Cl.
*H04B 7/06* (2006.01)
*H04L 5/00* (2006.01)
*H04W 16/28* (2009.01)

(56) References Cited

U.S. PATENT DOCUMENTS

| | | | |
|---|---|---|---|
| 2009/0232240 A1 | 9/2009 | Lakkis | |
| 2010/0150254 A1* | 6/2010 | Hansen | H04B 7/0619 375/259 |
| 2011/0064033 A1* | 3/2011 | Gong | H04B 7/0617 370/329 |
| 2011/0113137 A1* | 5/2011 | Ramachandran | H04B 7/0408 709/224 |
| 2011/0261708 A1* | 10/2011 | Grandhi | H04B 7/0452 370/252 |
| 2013/0059619 A1* | 3/2013 | Kim | H04L 5/0051 455/509 |
| 2013/0072244 A1* | 3/2013 | Jeong | H04B 7/086 455/509 |
| 2013/0182666 A1* | 7/2013 | Sutskover | H04B 7/0632 370/329 |
| 2013/0189930 A1* | 7/2013 | Kinnunen | H04L 5/0051 455/67.11 |
| 2013/0215844 A1 | 8/2013 | Seol et al. | |
| 2014/0055302 A1 | 2/2014 | Jia | |
| 2015/0079912 A1* | 3/2015 | Dehos | H04B 1/408 455/76 |
| 2015/0245335 A1* | 8/2015 | Zhou | H04W 48/16 370/329 |
| 2015/0282001 A1* | 10/2015 | Kwak | H04B 7/0695 370/229 |
| 2015/0289147 A1* | 10/2015 | Lou | H04B 7/0452 370/329 |
| 2016/0080058 A1* | 3/2016 | Kang | H04B 7/063 370/329 |
| 2016/0211957 A1* | 7/2016 | Kenney | H04W 24/00 |
| 2016/0380680 A1* | 12/2016 | Yang | H04B 7/0695 370/329 |

FOREIGN PATENT DOCUMENTS

| | | |
|---|---|---|
| WO | 0215432 A1 | 2/2002 |
| WO | 2007040515 A2 | 4/2007 |
| WO | 2013170169 A2 | 11/2013 |

OTHER PUBLICATIONS

Https://www.merriam-webster.com/dictionary/schedule.*
Anding Wang et al., Low Complexity Direction of Arrival (DoA) Estimation for 2D Massive MIMO Systems, Globecom Workshop: International Workshop on Emerging Technologies for LTE-Advanced and Beyond-4G, 2012 IEEE, Dec. 3, 2012, pp. 703-707.
PCT International Search Report, dated May 20, 2015, in connection with International Application No. PCT/EP2014/062677, all pages.
PCT Written Opinion, dated May 20, 2015, in connection with International Application No. PCT/EP2014/062677, all pages.
India Office Action dated Dec. 3, 2019, in connection with India Application No. 201617039695, 7 pages.
European Communication dated Jul. 1, 2019 in connection with European Application No. 14736657.9, 7 pages.
European Communication dated Dec. 9, 2022 in connection with European Application No. 14736657.9, 5 pages.
European Communication dated Oct. 11, 2023 in connection with European Application No. 14736657.9, 5 pages.

* cited by examiner

DETERMINATION OF BEAM CONFIGURATION

TECHNICAL FIELD

Embodiments presented herein relate to beam configuration, and particularly to a method, a radio transceiver device, a computer program, and a computer program product for determining a beam configuration between a first radio transceiver device and a second radio transceiver device.

BACKGROUND

In communications networks, there may be a challenge to obtain good performance and capacity for a given communications protocol, its parameters and the physical environment in which the communications network is deployed.

For example, one potential issue in communications network is how to establish a lock between transmission beams of a first radio transceiver device with reception beams of a second radio transceiver device. For example, large antenna arrays are envisioned for so-called extremely high frequency transmission, such as millimeter wave (mmW) transmission, in order to provide sufficient signal energy collection at these short wavelengths. For example, antenna arrays with 10-by-10 antenna elements or more may not be uncommon. The associated coherent combining may enable pronounced beamforming and directional selectivity.

In order to establish a connection between two radio transceiver devices, e.g. a wireless terminal and a network node, their transmit and receive beams must thus be directed so that they "meet". Two approaches that in traditional communications systems may be used for obtaining initial beam lock will be summarized next.

According to a first approach, highly directional beams are used only for user plane transmissions once the wireless terminal is attached to the network node at the control plane. Previously established control channels are then used for signaling the preferred beamforming configurations.

According to a second approach, while transmitter is transmitting in an omni-directional mode, the receiver identifies the preferred multi-antenna combining weights to maximize receiver performance. These same weights are then used for transmission to point the transmit beam in the same direction.

The performance criteria used to compare different beamforming options and to determine the optimal configuration may for example be the maximum reference signal to interference and noise ratio (SINR) or maximum received energy.

The above summarized approaches have some shortcomings in practice and limit the applicability of high-order beamforming.

For example, the prerequisite of previously available control channels before the beam lock procedure may be prohibitive in deployments where even low-rate signaling requires some degree of beamforming.

For example, at high frequencies, the omni-directional transmission mode may not provide sufficient signal energy to be collected by the receiver for reliable detection even after receiver beamforming is applied, especially in the uplink direction (i.e., transmission from a wireless terminal to a network node).

For example, the omni-directional transmission mode may not result in choosing the optimal beam configurations in environments with multiple path options (e.g., a line-of-sight (LOS) path and one or more reflection paths).

Hence, there is still a need for an improved beam lock process for selecting a preferred beam configuration.

SUMMARY

An object of embodiments herein is to provide an improved beam lock process for selecting a preferred beam configuration.

The inventors of the enclosed embodiments have discovered that it may be tedious to perform beam locking that relies on previously established control channels for feedback information. A particular object is therefore to provide beam lock process for selecting a preferred beam configuration without relying on previously established control channels.

According to a first aspect there is presented a method for determining a beam configuration between a first radio transceiver device and a second radio transceiver device. The method is performed by the first radio transceiver device. The method comprises performing beam searching. The beam searching comprises transmitting a first sounding signal in all transmit beam configurations in a set of transmit beam configurations. The beam searching comprises receiving, from the second radio transceiver device, a second sounding signal in all receive beam configurations in a set of receive beam configurations. The method comprises determining a beam configuration based on the receive beam configuration in the set of receive beam configurations in which the second sounding signal having best predetermined metric was received.

Advantageously this provides an efficient beam lock process for selecting a preferred beam configuration.

Advantageously this provides an efficient beam lock process for selecting a preferred beam configuration without relying on previously established control channels for feedback information.

Advantageously the disclosed process may use the actual beam shapes used in data transmission for selecting the preferred beam configurations, thereby providing robust beam selection decisions and maximizing data transmission performance.

Advantageously the disclosed process may be a good match for both multi-stage beam finding algorithms, such as a tree search approach with successively increased beam resolution, and to single-stage beam finding algorithms.

According to a second aspect there is presented a radio transceiver device for determining a beam configuration between the radio transceiver device and a second radio transceiver device. The radio transceiver device comprises a processing unit. The processing unit is configured to cause the radio transceiver device to perform beam searching. The beam searching comprises transmitting a first sounding signal in all transmit beam configurations in a set of transmit beam configurations. The beam searching comprises receiving, from the second radio transceiver device, a second sounding signal in all receive beam configurations in a set of receive beam configurations. The processing unit is configured to cause the radio transceiver device to determine a beam configuration based on the receive beam configuration in the set of receive beam configurations in which the second sounding signal having best predetermined metric was received.

According to a third aspect there is presented a computer program for determining a beam configuration between a first radio transceiver device and a second radio transceiver device, the computer program comprising computer program code which, when run on a processing unit of the first radio transceiver device, causes the first radio transceiver device to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
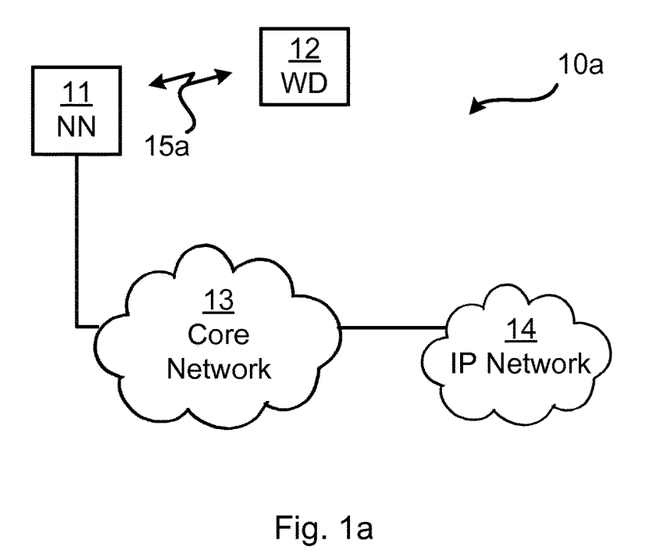
FIGS. 1a, 1b, and 1c are schematic diagrams illustrating communications between radio transceiver devices according to embodiments.

FIG. 1a is a schematic diagram illustrating a communications network boa where embodiments presented herein can be applied. The communications network boa comprises a radio transceiver device 11 in the form of a network node (NN). The network node may be provided as a base transceiver station (BTS), a Node B, an Evolved Node B, or an access point, such as an access point for Wi-Fi. The radio transceiver device 11 in FIG. 1a is configured to provide network coverage to a radio transceiver device 12 in the form of a wireless device (WD). The wireless device may be a hand-held wireless transceiver device, such as a mobile phone, a smartphones, a tablet computer, a laptop computer or the like, or other type of user equipment (UE) or Wi-Fi device. The radio transceiver device 11 thus acts as a radio base station for the radio transceiver device 12. The radio transceiver device 11 and the radio transceiver device 12 are configured to be operatively connected via a wireless link 15a. The communications network boa further comprises a core network 13. The radio transceiver device 11 is operatively connected to the core network 13. The core network 13 is in turn operatively connected to an Internet Protocol (IP) based service network 14. The radio transceiver device 12 is thereby enabled to access content and services as provided by the IP based service network 14 via the wireless link 15a.

Figure 1B:
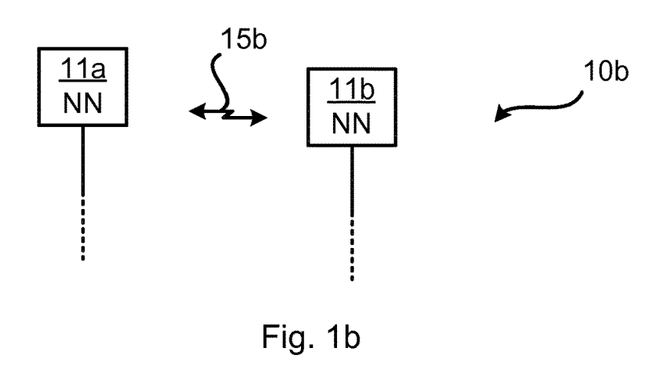

FIG. 1b is schematic diagram illustrating communications between two radio transceiver devices embodied as a first network node 11a and a second network node 11b, the two radio transceiver devices 11a, 11b defining a communications network 10b. The radio transceiver device 11a and the radio transceiver device 11b are configured to be operatively connected via a wireless link 15b.

Figure 1C:
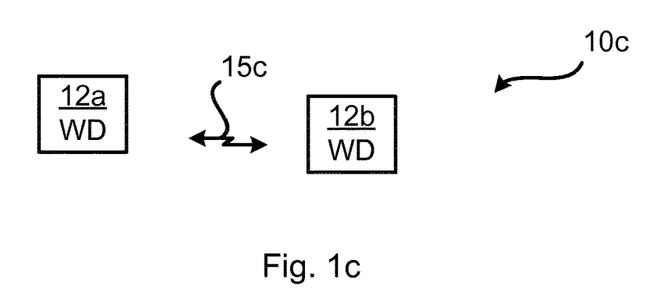

FIG. 1c is schematic diagram illustrating communications between two radio transceiver devices embodied as a first wireless device 12a and a second wireless device 12b, the two radio transceiver devices 12a, 12b defining a communications network 10c. The radio transceiver device 12a and the radio transceiver device 12b are configured to be operatively connected via a wireless link 15c.

As noted above, large antenna arrays are envisioned for so-called extremely high frequency transmission, such as millimeter wave (mmW) transmission, in order to provide sufficient signal energy collection at these short wavelengths. At such high frequencies, e.g. at mmW, antenna element sizes are small and signals are transmitted and received using narrow beamforming to provide sufficient signal strength, which leads to strongly localized spatial energy distribution. A radio transceiver device, such as a new wireless device entering a communications network, must start receiving and transmitting signals, which implies that it and another radio transceiver device, such as a network node, must direct their antenna beams in the respective directions that provide a wireless link 15a, 15b, 15c with sufficient quality, via line-of-sight (LOS) or a reflection.

However, establishing the beam lock is not straightforward if no previously established means for control signalling exists. The herein disclosed embodiments provide mechanisms for enabling a beam search procedure that allows obtaining beam lock without requiring such a side channel. The embodiments disclosed herein particularly relate to determining a beam configuration between a first radio transceiver device and a second radio transceiver device. In order to obtain such beam configuration there is provided a radio transceiver device, a method performed by the radio transceiver device, a computer program comprising code, for example in the form of a computer program product, that when run on a processing unit, causes the radio transceiver device to perform the method.

Figure 2A:
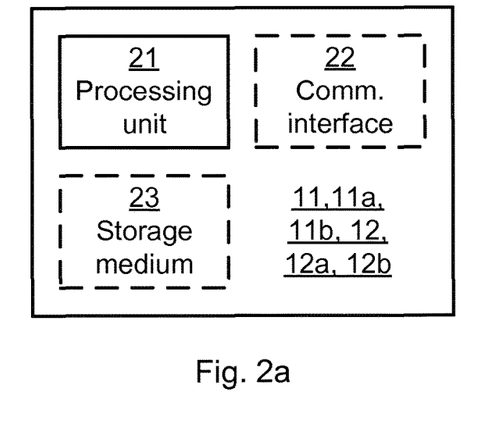
FIG. 2a is a schematic diagram showing functional units of a radio transceiver device according to an embodiment.

FIG. 2a schematically illustrates, in terms of a number of functional units, the components of a radio transceiver device 11, 11a, 11b, 12, 12a, 12b according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31a, 31b (as in FIG. 3), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The radio transceiver device 11, 11a, 11b, 12, 12a, 12b may further comprise a communications interface 22 for communications with another radio transceiver device 11, 11a, 11b, 12, 12a, 12b. As such the communications interface 22 may comprise one or more transmitters and receivers, comprising analogue and digital components and a suitable number of antennas for radio communications. The processing unit 21 controls the general operation of the radio transceiver device 11, 11a, 11b, 12, 12a, 12b e.g. by sending data and control signals to the communications interface 22 and the storage medium 23, by receiving data and reports from the communications interface 22, and by retrieving data and instructions from the storage medium 23. Other components, as well as the related functionality, of the radio transceiver device 11, 11a, 11b, 12, 12a, 12b are omitted in order not to obscure the concepts presented herein.

Figure 2B:
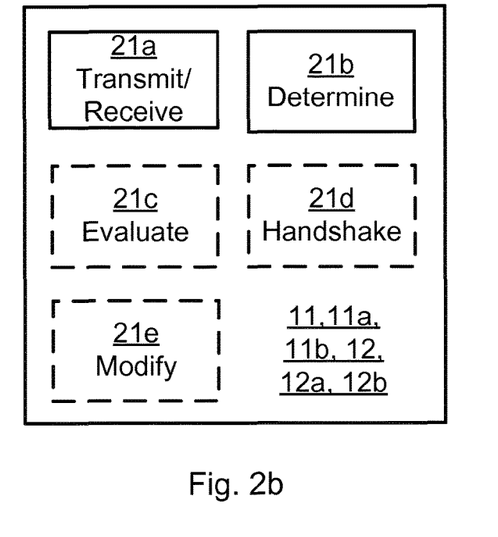
FIG. 2b is a schematic diagram showing functional modules of a radio transceiver device according to an embodiment.

FIG. 2b schematically illustrates, in terms of a number of functional modules, the components of a radio transceiver device 11, 11a, 11b, 12, 12a, 12b according to an embodiment. The radio transceiver device 11, 11a, 11b, 12, 12a, 12b of FIG. 2b comprises a number of functional modules such as a transmit and/or receive module 21a. The radio transceiver device 11, 11a, 11b, 12, 12a, 12b of FIG. 2b may further comprises a number of optional functional modules, such as any of a determine module 21b, an evaluate module 21c, a handshake module 21d, and a modify module 21e. The functionality of each functional module 21a-e will be further disclosed below in the context of which the functional modules 21a-e may be used. In general terms, each functional module 21a-e may be implemented in hardware or in software. The processing unit 21 may thus be arranged to from the storage medium 23 fetch instructions as provided by a functional module 21a-e and to execute these instructions, thereby performing any steps as will be disclosed hereinafter.

The radio transceiver device 11, 11a, 11b, 12, 12a, 12b may be provided as a wireless terminal (a mobile phone, smartphone, tablet computer or laptop computer, such as a cellular user equipment (UE), a Wi-Fi device, etc.) or a as a network node (a cellular radio base station such as a Node B or an evolved Node B, or Wi-Fi access point, etc.). In FIG. 1a a first radio transceiver device 12 is provided as a wireless terminal and a second radio transceiver device 11 is provided as network node; In FIG. 1b a first radio transceiver device 11a is provided as a network node and a second radio transceiver device 11b is provided as a network node; and In FIG. 1c a first radio transceiver device 12a is provided as a wireless terminal and a second radio transceiver device 12b is provided as a wireless terminal.

Figure 3:
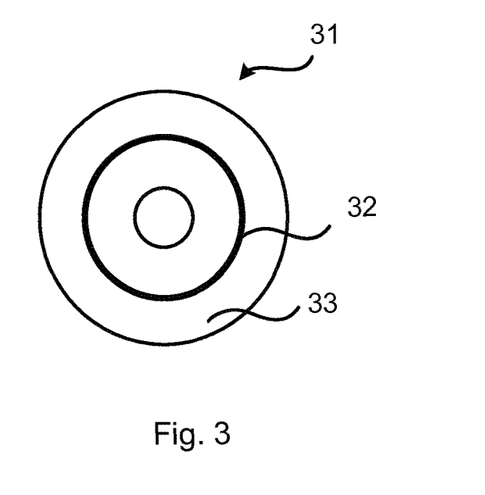
FIG. 3 shows one example of a computer program product comprising computer readable means according to an embodiment.
Figure 4:
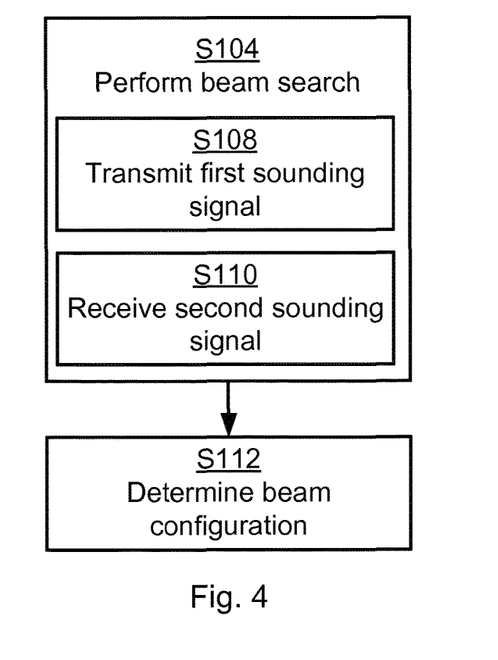
FIGS. 4, 5, and 6 are flowcharts of methods according to embodiments.
Figure 5:
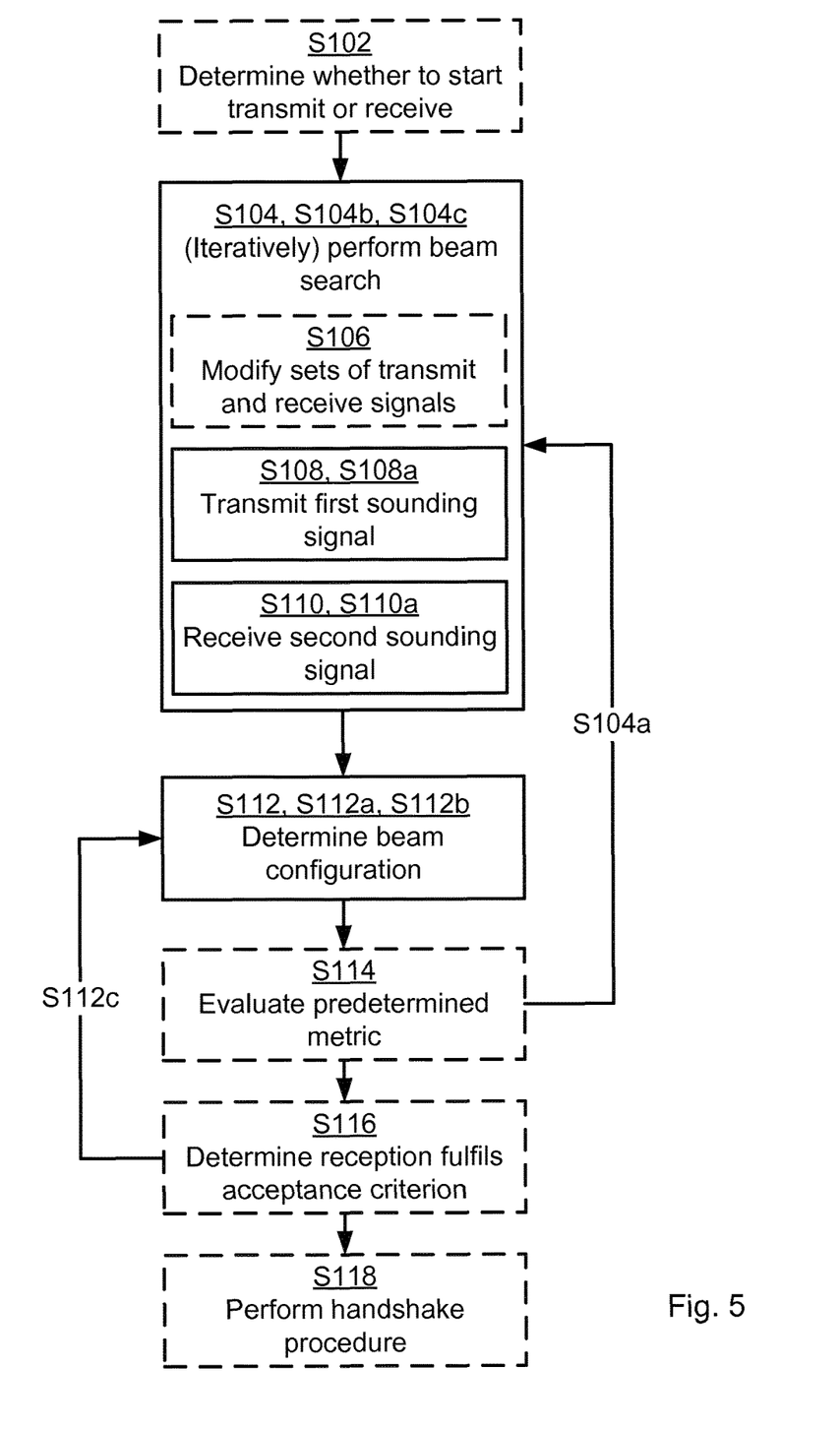
Figure 6:
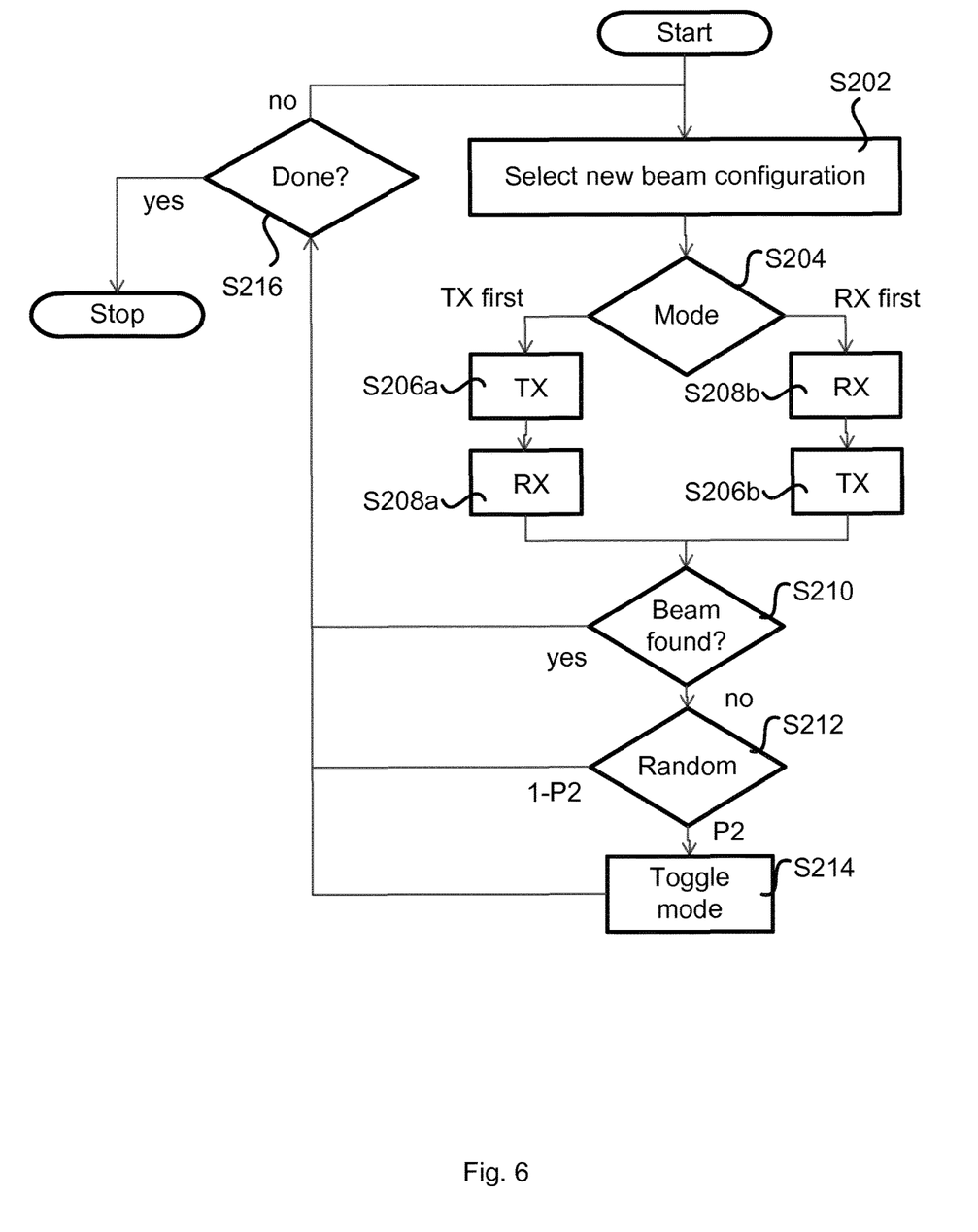

FIGS. 4, 5, and 6 are flow charts illustrating embodiments of methods for determining a beam configuration between a first radio transceiver device and a second radio transceiver device. The methods are performed by the radio transceiver device 11, 11a, 12a acting as the first radio transceiver device. The methods are advantageously provided as computer programs 32. FIG. 3 shows one example of a computer program product 31 comprising computer readable means 33. On this computer readable means 33, a computer program 32 can be stored, which computer program 32 can cause the processing unit 21 and thereto operatively coupled entities and devices, such as the communications interface 22 and the storage medium 23, to execute methods according to embodiments described herein. The computer program 32 and/or computer program product 31 may thus provide means for performing any steps as herein disclosed.

In the example of FIG. 3, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 32 is here schematically shown as a track on the depicted optical disk, the computer program 32 can be stored in any way which is suitable for the computer program product 31.

Reference is now made to FIG. 4 illustrating a method for determining a beam configuration between a first radio transceiver device 11, 11a, 12a and a second radio transceiver device 12, 11b, 12b according to an embodiment. The method is performed by the first radio transceiver device 11, 11a, 12a.

The first radio transceiver device 11, 11a, 12a is configured to, in a step S104, perform beam searching. The processing unit 21 of the radio transceiver device 11, 11a, 12a may be configured to perform S104, for example by executing functionality of the transmit/receive module 21a. The computer program 32 and/or computer program product 31 may thus provide means for this beam searching.

The beam searching comprises, in a step S108, transmitting a first sounding signal. The first sounding signal is transmitted in all transmit beam configurations in a set of transmit beam configurations. The processing unit 21 of the radio transceiver device 11, 11a, 12a may be configured to perform S108, for example by executing functionality of the transmit/receive module 21a. The computer program 32 and/or computer program product 31 may thus provide means for this transmitting.

The beam searching comprises, in a step S110, receiving, from the second radio transceiver device 12, 11b, 12b, a second sounding signal in all receive beam configurations in a set of receive beam configurations. The processing unit 21 of the radio transceiver device 11, 11a, 12a may be configured to perform S110, for example by executing functionality of the transmit/receive module 21a. The computer program 32 and/or computer program product 31 may thus provide means for this receiving.

The first radio transceiver device 11, 11a, 12a is configured to, in a step S112, determine a beam configuration. The processing unit 21 of the radio transceiver device 11, 11a, 12a may be configured to perform S112, for example by executing functionality of the determine module 21b. The computer program 32 and/or computer program product 31 may thus provide means for this determining. The beam configuration is based on the receive beam configuration in the set of receive beam configurations in which the second sounding signal having best predetermined metric was received. Examples of the predetermined metric will be disclosed below.

Embodiments relating to further details of determining a beam configuration between a first radio transceiver device 11, 11a, 12a and a second radio transceiver device 12, 11b, 12b will now be disclosed.

There are different examples of suitable predetermined metrics. For example, the predetermined metric may relate to received power. Hence, the beam configuration may in step S112 be determined based on the receive beam configuration in the set of receive beam configurations in which the second sounding signal having highest received power was received. Additionally or alternatively, the predetermined metric may relate to received second sounding signal quality. Hence, the beam configuration may in step S112 be determined based on the receive beam configuration in the set of receive beam configurations in which the second sounding signal having highest received second sounding signal quality, for example SINR, was received.

Reference is now made to FIG. 5 illustrating methods for determining a beam configuration between a first radio transceiver device 11, 11a, 12a and a second radio transceiver device 12, 11b, 12b according to further embodiments as performed by the first radio transceiver device 11, 11a, 12a.

Determining the beam configuration may comprise determining a receive direction and a transmit direction. Particularly, determining the beam configuration in step S112 may comprise an optional step S112a of determining a selected receive direction as the receive direction having best predetermined metric; and an optional step S112b of determining a selected transmit direction as the selected receive direction. The processing unit 21 of the radio transceiver device 11, 11a, 12a may be configured to perform S112a and S112b, for example by executing functionality of the determine module 21b. The computer program 32 and/or computer program product 31 may thus provide means for this determining.

There are different ways to choose the set of transmit beam configurations and the set of receive beam configurations. For example, the set of transmit beam configurations may comprise at least two transmit directions, and the set of receive beam configurations may comprise at least two receive directions. The transmit directions may be the same as the receive directions (although strictly speaking the transmit directions relate to the directions of energy emanating from the first radio transceiver device 11, 11a, 12a whilst the receive directions relate to the directions of collecting energy arriving towards the first radio transceiver device 11, 11a, 12a).

The number of transmit directions and the number of receive directions may depend on properties of the first radio transceiver device 11, 11a, 12a. For example, a radio transceiver device embodied as a network node 12a may have more antenna elements than a radio transceiver device embodied as a wireless device 11, 11a and thus be enabled to form a larger number of transmit and receive directions with narrower beam widths. Also the number of iterations to perform the beam searching may depend on what kind of device is performing the beam searching; it may even be so that only one of the first radio transceiver device 11, 11a, 12a and the second radio transceiver device 12, 11b, 12b performs iterative beam forming whilst the other of the first radio transceiver device 11, 11a, 12a and the second radio transceiver device 12, 11b, 12b transmits and/or receives in a single stage only.

The first radio transceiver device 11, 11a, 12a may start by stepping through its sequence of widest (lowest-resolution) beam settings in the set of transmit beam configurations and in the set of receive beam configurations. For each beam setting, the first radio transceiver device 11, 11a, 12a may circulate through its widest beam settings, according to a predetermined protocol. For each beam combination of the first radio transceiver device 11, 11a, 12a and the second radio transceiver device 12, 11b, 12b, the first radio transceiver device 11, 11a, 12a and the second radio transceiver device 12, 11b, 12b send a respective sounding signal through the channel, as in steps S108, S110. The first and second sounding signals may be sent time- or frequency-multiplexed (the latter assuming relatively small duplex gap so that the beam shapes for the first sounding signal and the second sounding signal are similar).

For each transmit/receive beam configuration, the receiver side in each of the links evaluates the quality of the received sounding signal. At the end of the first, wide-beam round, the beam combination resulting in best SINR, or other received signal power metric or received signal quality metric, is saved as the preferred one. Alternatively, the first encountered beam combination, e.g., achieving a predetermined SINR, is saved.

Based on reciprocity arguments, both links experience best possible reception quality using the preferred configuration and a confirmation handshake is not mandatory.

However, optionally, at the end of the stage, the first radio transceiver device 11, 11a, 12a and the second radio transceiver device 12, 11b, 12b may perform such a handshake, for example using the preferred beam configuration. The first radio transceiver device 11, 11a, 12a may thus be configured to, in an optional step S118, perform a handshake procedure with the second radio transceiver device 12, 11b, 12b to confirm the determined beam configuration. The handshake may involve transmitting the best beam combination index, a list of several "good" combination indices, corresponding SINR measures, etc. in one or both links. It may be assumed that the wide-beam connection will be able to carry low-rate control signaling, e.g. by using more coding, not requiring a high-gain beam. The processing unit 21 of the radio transceiver device 11, 11a, 12a may be configured to perform S118, for example by executing functionality of the handshake module 21d. The computer program 32 and/or computer program product 31 may thus provide means for this beam handshaking.

If one or both of the first radio transceiver device 11, 11a, 12a and the second radio transceiver device 12, 11b, 12b has reported more than one "good" beam combination, one of the first radio transceiver device 11, 11a, 12a and the second radio transceiver device 12, 11b, 12b may select the final preferred combinations after the first stage based on the presence and preferred beam configurations with respect to other devices or nodes in the communications network 10a, 10b, 10c. Hence, the first radio transceiver device 11, 11a, 12a may be configured to, in an optional step S116, determining that reception of the second sounding signal in at least two receive beam configurations from the set of receive beam configurations have a predetermined metric fulfilling an acceptance criterion; and in response thereto, in an optional step S104a, determine the beam configuration based on input from at least one other radio transceiver device. The processing unit 21 of the radio transceiver device 11, 11a, 12a may be configured to perform S16 and S104a, for example by executing functionality of the determine module 21b. The computer program 32 and/or computer program product 31 may thus provide means for this beam determining.

The beam searching may be performed by cycling over all possible transmit and/or receive beam directions, looking for the beam configurations with the largest transferred energy or the highest resulting SINR, or other predetermined metric. Thus, the beam searching in step S104 may be performed until the first sounding signal has been transmitted in all transmit directions of the set of transmit beam configurations and the second sounding signal has been received in all receive directions of the set of receive beam configurations.

However, the number of such combinations may become exceedingly large for large antenna arrays. Hence, the set of transmit directions may comprise only a (strict) subset of all possible transmit directions of the first radio transceiver device 11, 11a, 12a. Likewise, the set of receive directions may comprise only a (strict) subset of all possible receive directions of the first radio transceiver device 11, 11a, 12a.

As indicated above, the beam configuration may be iteratively determined. There are different ways to iteratively determine the beam configuration. For example, the widths of the beams used to transmit and receive the sounding signals may be changed. In a multi-stage or tree-search beam finding process, high-resolution beam finding may be based on forming beams with successively narrower beam-width and larger antenna gain. The successive refinement sequence may be applied to both receive and transmit beam forms. Particularly, the first radio transceiver device 11, 11a, 12a may be configured to, in an optional step S104b, iteratively performing the beam searching in step S104 by using beams having successively narrowed widths for transmitting the first sounding signals. Additionally or alternatively, the set of transmit beam configurations and the set of receive beam configurations may be changed between two beam searching iterations.

Figure 9:
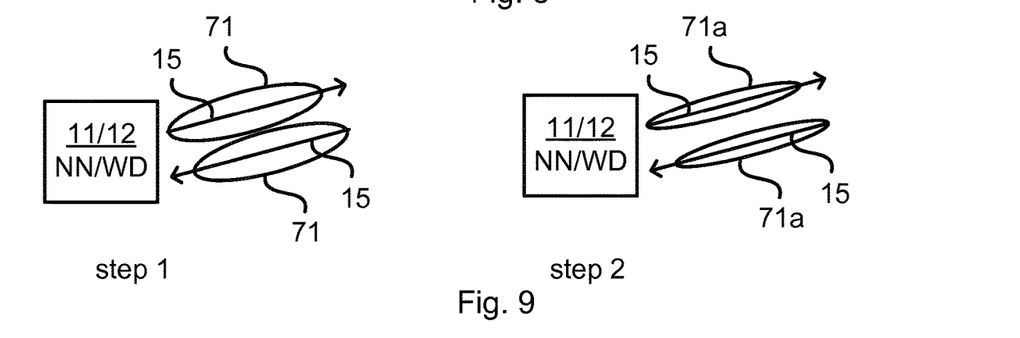
FIG. 9 schematically illustrates two steps of beam searching according to an embodiment.

In the first stage of the iterative beam searching procedure, a small group of antenna elements (at least one pair) in a large antenna array may be used for coherent detection over a number of direction hypotheses. The coherently combined outputs from each element group may be combined non-coherently to maximize signal power in the detection test. The direction with largest detected desired signal energy may be saved as the preferred direction. Particularly, the first radio transceiver device 11, 11a, 12a may be configured to, in an optional step S104c, iteratively performing the beam searching by performing a number of sub-steps. One such sub-step S106 may comprise modifying the set of transmit beam configurations and the set of receive beam configurations based on the predetermined metric of the second sounding signal. The processing unit 21 of the radio transceiver device 11, 11a, 12a may be configured to perform S106, for example by executing functionality of the modify module 21e. The computer program 32 and/or computer program product 31 may thus provide means for this modifying. One such sub-step S108a may comprise transmitting the first sounding signal in all transmit beam configurations in the set of modified transmit beam configurations. The processing unit 21 of the radio transceiver device 11, 11a, 12a may be configured to perform S108a, for example by executing functionality of the transmit/receive module 21a. The computer program 32 and/or computer program product 31 may thus provide means for this transmitting. One such sub-step S108b may comprise receiving, from the second radio transceiver device 12, 11b, 12b, the second sounding signal in all receive beam configurations in the modified set of receive beam configurations. The processing unit 21 of the radio transceiver device 11, 11a, 12a may be configured to perform S108b, for example by executing functionality of the transmit/receive module 21a. The computer program 32 and/or computer program product 31 may thus provide means for this receiving. As illustrated in FIG. 9, the width of the beams may change from one beam search iteration to the next. Particularly, beams 71 having a first width W1 may be used to transmit the first sounding signal in the set of transmit beam configurations (step 1) and beams 71a having a second width W2, narrower than the first width W1, may be used to transmit the first sounding signal in the modified set of transmit beam configurations (step 2).

Figure 7:
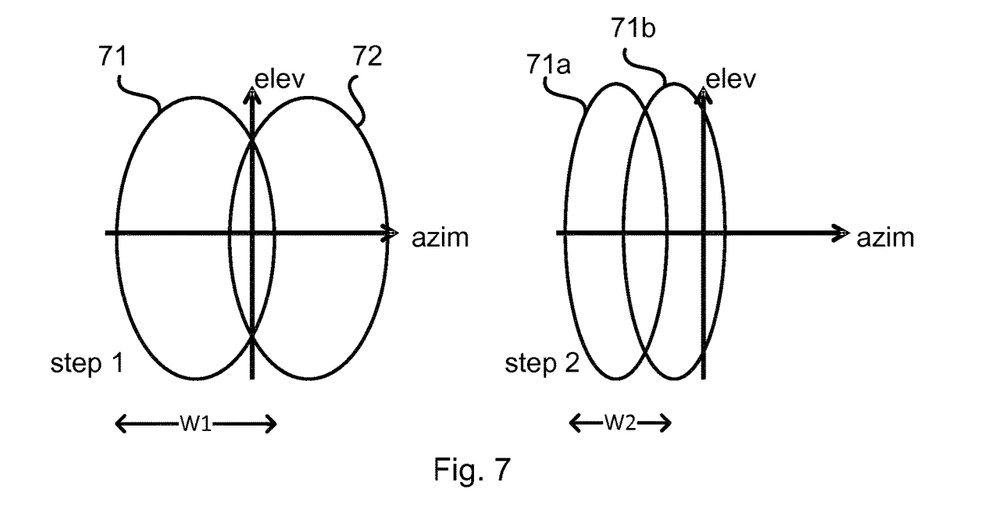
FIG. 7 schematically illustrates two steps of one-dimensional beam searching according to an embodiment.
Figure 8:
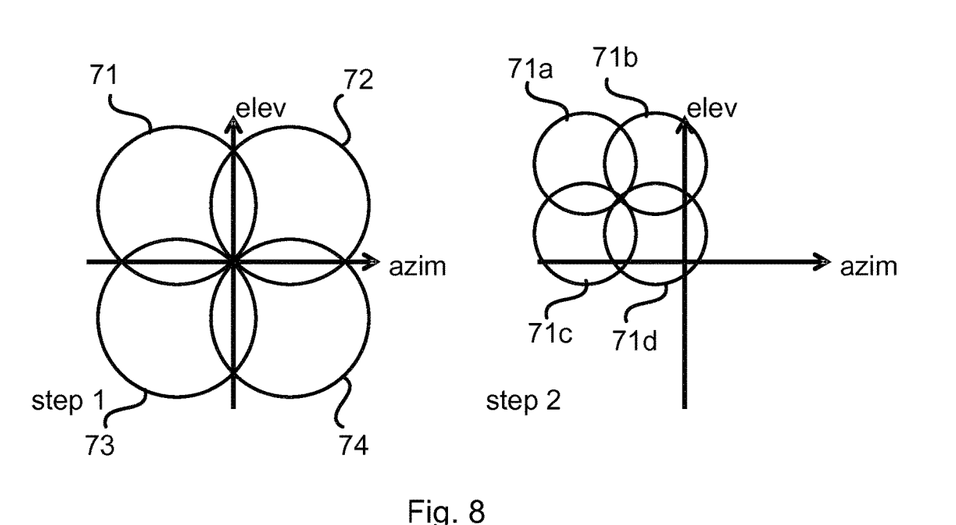
FIG. 8 schematically illustrates two steps of two-dimensional beam searching according to an embodiment.

The choice of the initial (small) group of elements in the antenna array, defining the set of transmit beam configurations and the set of receive beam configurations, may be e.g. a pair along one dimension of the array (resulting in a directional beam in one dimension and a flat one in the other dimension, option A), or a 2-by-2 antenna element group (resulting in a beam that is directional in both dimensions, option B). The beam sweeping may thus be 1-D (a) or 2-D (b); that is, either in only one of azimuth and elevation direction or in both azimuth and elevation directions. This is schematically illustrated in FIGS. 7 and 8. In FIG. 7 beam searching is performed in azimuth direction only, and in FIG. 8 beam searching is performed in both the azimuth direction and in the elevation direction. FIGS. 7 and 8 schematically illustrate two stages of an iterative beam searching process; in step 1 wide beams 71, 72, 73, 74 having a width W1 are used, and in step 2 narrow beams 71a, 71b, 71c, 71d having a width W2<W1 are used. In step 2 the beam searching is concentrated on the beam 71 in step 1 for which the best predetermined metric in step 1 was determined.

In each subsequent stage of the iterative beam searching, the preferred beam configuration from the previous stage may used as the starting point and higher-resolution beam configurations in the neighborhood of the previous preferred beam configurations may be tested in a similar manner by cycling through the beam directions by the first radio transceiver device 11, 11a, 12a and the second radio transceiver device 12, 11b, 12b. This may be accomplished by using a larger number of antenna elements, combined coherently to form narrower beams in the vicinity of that direction. For example, in the first stage two antenna elements per dimension may be used; in the second stage four elements per dimension may be combined, and in the third stage eight antenna elements per dimension may be used, etc. The coherent group outputs may still be combined non-coherently.

As the skilled person understands, these are just a few examples of how the beam searching may be adapted from one iteration stage to the next. Furthermore, the widths of the beams may be changed differently depending on the iteration stage.

Signal power outputs or signal quality metrics from all tested beam configurations may be compared and the beam configuration with the highest power or best metric may be chosen as the preferred beam configuration. Note that, in some scenarios, antenna element groups with fewer antenna elements and wider beams may provide better signal collection than higher-resolution beam(s). In such case, one group of antenna elements with the identified beamforming weights is used for data reception, while some antenna elements may remain unused. A confirmation procedure may thus be repeated over the widest-beam or the latest preferred beam configuration.

In general terms there may be different ways to determine when to stop the iterative beam forming. For example, the first radio transceiver device 11, 11a, 12a may be configured to, in an optional step S114, evaluating the predetermined metric for each received second sounding signal. The processing unit 21 of the radio transceiver device 11, 11a, 12a may be configured to perform S114, for example by executing functionality of the evaluate module 21c. The computer program 32 and/or computer program product 31 may thus provide means for this evaluating. The beam searching in transmit beam configurations in the set of transmit beam configurations not yet transmitted in and in receive beam configurations in the set of receive beam configurations not yet received may then be performed in an optional step S112c until an acceptance criterion is fulfilled. There are different examples of such an acceptance criterion. For example, the acceptance criterion may be that the quality of the received second sounding signal is higher than a threshold, that a maximum time for performing the beams searching has expired, or that the number of iterations for iteratively performing the beam searching has been reached. That is, one or both of the first radio transceiver device 11, 11a, 12a and the second radio transceiver device 12, 11b, 12b may signal that it has reached the limit of its beamforming resolution. Once both the first radio transceiver device 11, 11a, 12a and the second radio transceiver device 12, 11b, 12b have signaled that, or after a predetermined number of stages, the iterative process is thus complete.

The pattern according to which the beam search is performed may depend on the previous beam reception performance. This may be accomplished in a way similar to simulated annealing optimization: When a promising beam configuration is found—providing reception of the signals or an increased value of the predetermined metric—beam configurations close to this configuration are searched. Thus, modifying the set of transmit beam configurations and the set of receive beam configurations may be based on a simulated annealing procedure. This may allow for finding the optimal or a near-optimal beam configuration (possibly a local maximum), by narrowing the beam and/or by making small adjustments of the beam direction. At the same time, the second radio transceiver device 12, 11b, 12b will receive a relative constant beam configuration from this side, which will mimic the fast-slow role assignment disclosed below. As the skilled person understands, an alternative to the simulated annealing procedure may be a genetic optimization procedure.

Using the simulated annealing technique, the algorithm evaluates in each step of the beam configuration procedure an acceptance probability function $P(e,e',T)$, where e may be the predetermined metric evaluated at the present beam configuration, e' may be the metric evaluated at a new candidate beam configuration (candidates both close and far away from the present beam configuration are evaluated), and T is a time-varying temperature parameter, which tends towards zero to end the algorithm within a time budget. Typically, $P(e,e',T)$ may be set to 1 if $e'>e$, thereby always accepting a candidate beam configuration better than the present beam configuration. Since $P(e,e',T)$ is positive even when $e'<e$, i.e., when the new candidate beam configuration is worse than the present state, there is a probability P1 to move to a completely different beam configuration, with a different direction and/or wider beam resolution (possibly allowing finding the global maximum instead of getting stuck in a local maximum). As T goes to zero, the $P(e,e',T)$ function goes to zero if $e'<e$, thereby letting the algorithm stay at a found solution (beam configuration) at the end of the iterations. The probability P1 of moving away from the found local maximum to a new search region may decrease over time, as the temperature T decreases, in order to converge to a chosen beam configuration within a predefined and limited beam-search time. Hence, modifying the set of transmit beam configurations and the set of receive beam configurations may be based on a first probability parameter P1. This first probability parameter P1 may for example enable a beam searching to be moved from a potential local best predetermined metric and to start over in search of another potentially improved local best predetermined metric or even a global best predetermined metric. The value of P1 may be determined to achieve a desired probability to move the beam searching to another beam configuration.

At the end of the iterative beam forming, the first radio transceiver device 11, 11a, 12a and the second radio transceiver device 12, 11b, 12b have identified a combination of beam configurations providing the best-SINR link, or optimizing other predetermined metric. As noted above, the first radio transceiver device 11, 11a, 12a and the second radio transceiver device 12, 11b, 12b may optionally finalize the procedure with an additional protocol handshake, and may then commence a high-rate data transfer.

Single-stage (linear) beam search is a special case of the described procedure, where the beam combination evaluation process is performed only once, at a single beam resolution. Hence, according to an embodiment the set of transmit beam configurations comprises only one transmit direction, and the set of receive beam configurations comprises only one receive direction.

The beam forming at the first radio transceiver device 11, 11a, 12a may be performed during a time interval when the transmitter is transmitting special channel sounding signals, e.g. according to different transmit beamforming patterns. Thus, the order of transmission of the first sounding signal and reception of the second sounding may be defined by a predetermined pattern of transmissions and receptions. This predetermined pattern of transmissions and receptions may define a fast/slow configuration switching role assignment of the first radio transceiver device 11, 11a, 12a and the second radio transceiver device 12, 11b, 12b. Additionally or alternatively, the set of transmit beam configurations and the set of receive beam configurations may thus be defined by a predetermined pattern of beam configurations. However, alternatively, there is no fast/slow configuration switching role assignment or regular predetermined beam sequences. Each of the first radio transceiver device 11, 11a, 12a and the second radio transceiver device 12, 11b, 12b may cycle through its possible beam forms in a random, pseudo-random, or other order at the same rate.

One of the first radio transceiver device 11, 11a, 12a and the second radio transceiver device 12, 11b, 12b needs to transmit and one receive in a certain slot. For two such radio transceiver devices, unknown to each other and with no hierarchy, a static mapping may not easily be implemented beforehand. One option is based on using a second probability parameter P2. Particularly, the first radio transceiver device 11, 11a, 12a may be configured to, in an optional step S102, determine whether to first transmit the first sounding signal in one of the transmit beam configurations or to first receive the second sounding signal in one of the receive beam configurations based on the second probability parameter P2. The processing unit 21 of the radio transceiver device 11, 11*a*, 12*a* may be configured to perform S102, for example by executing functionality of the determine module 21*b*. The computer program 32 and/or computer program product 31 may thus provide means for this determining. For example, not receiving any second sounding signals may either be caused by the beams not pointing in the correct directions, or that both the first radio transceiver device 11, 11*a*, 12*a* and the second radio transceiver device 12, 11*b*, 12*b* were both in reception mode at the same time. Using the second probability parameter P2, the first radio transceiver device 11, 11*a*, 12*a* may toggle to transmission mode, thereby switching order of transmission of the first sounding signal and reception of the second sounding signal. The value of P2 may be determined so as to achieve a desired probability of starting in either the transmission mode or in the reception mode.

It may be assumed that both the first radio transceiver device 11, 11*a*, 12*a* and the second radio transceiver device 12, 11*b*, 12*b* have a common timing reference to synchronize the beam searching outlined above. The timing reference may be obtained by the terminal from a separate beacon signal, other radio access technology signals, possibly from other frequency bands, or a global positioning (GPS) Coordinated Universal Time (French: Temps Universel Coordonné, UTC) time stamp. Hence, the first radio transceiver device 11, 11*a*, 12*a* may share a common timing reference with the second radio transceiver device 12, 11*b*, 12*b*.

Reference is now made to FIG. 6 illustrating methods for determining a beam configuration between a first radio transceiver device 11, 11*a*, 12*a* and a second radio transceiver device 12, 11*b*, 12*b* according to an embodiment. The method of FIG. 6 is based on the methods disclosed above with references to FIGS. 4 and 5.

S202: The first radio transceiver device 11, 11*a*, 12*a* selects a new beam configuration. One way to implement step S202 is to perform any of step S104, S104*a*, S104*b*, S104*c*, and S106.

S204: The first radio transceiver device 11, 11*a*, 12*a* determines whether to first transmit a first sounding signal or to first receive a second sounding signal based on its current mode, as defined by its current value of the second probability parameter P2. One way to implement step S204 is to perform step S102.

S206*a*, S206*b*: The first radio transceiver device 11, 11*a*, 12*a* transmits a first sounding signal. One way to implement step S206*a* is to perform any of step S108 and S108*a*.

S208*a*, S208*b*: The first radio transceiver device 11, 11*a*, 12*a* receives a second sounding signal. One way to implement step S208*a* is to perform any of step S110 and S110*a*.

S210: The first radio transceiver device 11, 11*a*, 12*a* checks if a beam configuration fulfilling the predetermined metric is found. If yes, step S216 is entered, and if no step S212 is entered. One way to implement step S210 is to perform any of step S112, S112*a*, S112*b*, S114, and S116.

S212: The first radio transceiver device 11, 11*a*, 12*a* generates a new value of the second probability parameter P2. Depending on the value of P2 it either enters step S214 or enters step S216. One way to implement step S212 is to perform step S102.

S214: The first radio transceiver device 11, 11*a*, 12*a* toggles mode regarding whether to first transmit a first sounding signal or to first receive a second sounding signal. One way to implement step S214 is to perform step S102.

S216: The first radio transceiver device 11, 11*a*, 12*a* checks if any beam fulfilling the predetermined metric was found in step S210 and/or if an acceptance criterion has bee fulfilled. If yes: the beam searching is complete, and if no:

step S202 is entered and a new beam configuration is selected. One way to implement step S216 is to perform any of step S106, S112, S112*a*, S112*b*, S112*c*, S114, and S116.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for determining a beam configuration between a first radio transceiver device and a second radio transceiver device, the method being performed by the first radio transceiver device and comprising the steps of:
    performing beam searching without relying on previously established control channels for feedback information by:
        deciding, in a mutually blind beam configuring between the first radio transceiver device and the second radio transceiver device, in what order a transmitting by the first radio transceiver device and a receiving by the first radio transceiver device will be performed;
        the first radio transceiver device performing the transmitting and the receiving in the decided order,
        wherein the transmitting comprises transmitting a first sounding signal in all transmit beam configurations in a set of transmit beam configurations; and
        wherein the receiving comprises receiving, from the second radio transceiver device, a second sounding signal in all receive beam configurations in a set of receive beam configurations; and
    determining a beam configuration for the first radio transceiver device based on the receive beam configuration in the set of receive beam configurations in which said second sounding signal having best predetermined metric was received.

2. The method according to claim 1, wherein said predetermined metric relates to at least one of received power and received second sounding signal quality, and wherein said beam configuration is determined based on the receive beam configuration in the set of receive beam configurations in which said second sounding signal having at least one of highest received power and highest received second sounding signal quality.

3. The method according to claim 1, wherein determining the beam configuration comprises:
    determining a selected receive direction as the receive direction having best predetermined metric; and
    determining a selected transmit direction as the selected receive direction.

4. The method according to claim 1, wherein the set of transmit beam configurations comprises at least two transmit directions, and wherein the set of receive beam configurations comprises at least two receive directions.

5. The method according to claim 1, wherein the set of transmit beam configurations comprises only one transmit direction, and wherein the set of receive beam configurations comprises only one receive direction.

6. The method according to claim 4, wherein number of transmit directions and number of receive directions depend on properties of the first radio transceiver device.

7. The method according to claim 1, wherein the set of transmit beam configurations and the set of receive beam configurations are defined by a predetermined pattern of beam configurations.

8. The method according to claim 1, wherein the order of transmission of the first sounding signal and reception of the second sounding signal is decided based on a predetermined pattern of transmissions and receptions.

9. The method according to claim 1, wherein the beam searching is performed until the first sounding signal has been transmitted in all transmit directions of the set of transmit beam configurations and the second sounding signal has been received in all receive directions of the set of receive beam configurations.

10. The method according to claim 9, wherein said set of transmit directions comprises a subset of all possible transmit directions of the first radio transceiver device.

11. The method according to claim 9, wherein said set of receive directions comprises a subset of all possible receive directions of the first radio transceiver device.

12. The method according to claim 1, further comprising:
evaluating said predetermined metric for each received second sounding signal; and
performing the beam searching in transmit beam configurations in the set of transmit beam configurations not yet transmitted in, and in receive beam configurations in the set of receive beam configurations not yet received in until an acceptance criterion is fulfilled.

13. The method according to claim 1, further comprising:
performing a handshake procedure with the second radio transceiver device to confirm the determined beam configuration.

14. The method according to claim 1, further comprising:
determining that reception of the second sounding signal in at least two receive beam configurations from the set of receive beam configurations have a predetermined metric fulfilling an acceptance criterion; and in response thereto:
determine the beam configuration based on input from at least one other radio transceiver device.

15. The method according to claim 1, wherein the first radio transceiver device shares a common timing reference with the second radio transceiver device.

16. The method according to claim 1, further comprising:
iteratively performing the beam searching by using beams having successively narrowed widths for transmitting the first sounding signals.

17. The method according to claim 1, further comprising:
iteratively performing the beam searching by:
modifying the set of transmit beam configurations and the set of receive beam configurations based on said predetermined metric of the second sounding signal;
transmitting the first sounding signal in all transmit beam configurations in the set of modified transmit beam configurations; and
receiving, from the second radio transceiver device, the second sounding signal in all receive beam configurations in the modified set of receive beam configurations.

18. The method according to claim 17, wherein beams having a first width are used to transmit the first sounding signal in the set of transmit beam configurations and wherein beams having a second width, narrower than the first width, are used to transmit the first sounding signal in the modified set of transmit beam configurations.

19. The method according to claim 17, wherein modifying the set of transmit beam configurations and the set of receive beam configurations is based on a simulated annealing procedure.

20. The method according to claim 17, wherein modifying the set of transmit beam configurations and the set of receive beam configurations is based on a first probability parameter.

21. The method according to claim 1, wherein the order of transmission of the first sounding signal and reception of the second sounding signal is decided based on a second probability parameter.

22. A radio transceiver device for determining a beam configuration between the radio transceiver device and a second radio transceiver device, the radio transceiver device comprising a processing unit configured to cause the radio transceiver device to:
perform beam searching without relying on previously established control channels for feedback by:
deciding, in a mutually blind beam configuring between the first radio transceiver device and the second radio transceiver device, in what order a transmitting by the radio transceiver device and a receiving by the radio transceiver device will be performed;
performing the transmitting and the receiving in the decided order,
wherein the transmitting comprises transmitting a first sounding signal in all transmit beam configurations in a set of transmit beam configurations; and
wherein the receiving comprises receiving, from the second radio transceiver device, a second sounding signal in all receive beam configurations in a set of receive beam configurations; and
determine a beam configuration for the first radio transceiver device based on the receive beam configuration in the set of receive beam configurations in which said second sounding signal having best predetermined metric was received.

23. A nontransitory computer readable storage medium comprising a computer program for determining a beam configuration between a radio transceiver device and a second radio transceiver device, the computer program comprising computer code which, when run on a processing unit of the radio transceiver device, causes the radio transceiver device to:
perform beam searching without relying on previously established control channels for feedback by:
deciding, in a mutually blind beam configuring between the first radio transceiver device and the second radio transceiver device, in what order a transmitting by the radio transceiver device and a receiving by the radio transceiver device will be performed;
the radio transceiver device performing the transmitting and the receiving in the decided order,
wherein the transmitting comprises transmitting a first sounding signal in all transmit beam configurations in a set of transmit beam configurations; and
wherein the receiving comprises receiving, from the second radio transceiver device, a second sounding signal in all receive beam configurations in a set of receive beam configurations; and
determine a beam configuration for the first radio transceiver device based on the receive beam configuration in the set of receive beam configurations in which said second sounding signal having best predetermined metric was received.

* * * * *